US008555291B2

(12) United States Patent
Nishihara

(10) Patent No.: US 8,555,291 B2
(45) Date of Patent: Oct. 8, 2013

(54) SYNCHRONIZATION CONTROL METHOD AND INFORMATION PROCESSING DEVICE

(75) Inventor: Kosuke Nishihara, Tokyo (JP)

(73) Assignee: NEC Corporation, Tokyo (JP)

(*) Notice: Subject to any disclaimer, the term of this patent is extended or adjusted under 35 U.S.C. 154(b) by 440 days.

(21) Appl. No.: 12/812,936

(22) PCT Filed: Jan. 14, 2009

(86) PCT No.: PCT/JP2009/050397
§ 371 (c)(1),
(2), (4) Date: Jul. 14, 2010

(87) PCT Pub. No.: WO2009/090964
PCT Pub. Date: Jul. 23, 2009

(65) Prior Publication Data
US 2011/0047556 A1    Feb. 24, 2011

(30) Foreign Application Priority Data

Jan. 17, 2008  (JP) ................................. 2008-008321

(51) Int. Cl.
*G06F 9/46*     (2006.01)
*H04B 1/66*     (2006.01)

(52) U.S. Cl.
USPC ............................ 718/106; 718/100; 375/240

(58) Field of Classification Search
USPC ................................ 375/240; 718/100, 106
See application file for complete search history.

(56) References Cited

U.S. PATENT DOCUMENTS

| | | | | |
|---|---|---|---|---|
| 5,978,830 A | * | 11/1999 | Nakaya et al. | 718/102 |
| 6,594,773 B1 | * | 7/2003 | Lisitsa et al. | 713/600 |
| 7,584,475 B1 | * | 9/2009 | Lightstone et al. | 718/104 |
| 2006/0161920 A1 | * | 7/2006 | An et al. | 718/102 |
| 2006/0215754 A1 | * | 9/2006 | Buxton et al. | 375/240.12 |
| 2007/0177669 A1 | * | 8/2007 | Kawashima et al. | 375/240.13 |

(Continued)

FOREIGN PATENT DOCUMENTS

| | | |
|---|---|---|
| JP | 7-44403 A | 2/1995 |
| JP | 10-187465 A | 7/1996 |

(Continued)

OTHER PUBLICATIONS

Chang, Kai-Hui, Tu, Wei-Ting, Yeh, Yi-Jong and Kuo, Sy-Yen,"Techniques to Reduce Synchronization in Distributed Parallel Logic Simulation," Taipei, Taiwan, 2002.*

(Continued)

*Primary Examiner* — Andre Boyce
*Assistant Examiner* — Renae Feacher

(57) ABSTRACT

Provided are a synchronization control section that executes a current thread and a reference thread in parallel, a waiting time calculation section that calculates the time needed for the reference thread to reach a second synchronization point as a waiting time of the current thread when the reference thread does not reach the second synchronization point at a time when the current thread reaches a first synchronization point, a quality difference calculation section that estimates a quality difference between data that the current thread generates by referring to processing data at the second synchronization point of the reference thread and data that the current thread generates without referring to the processing data, and a synchronization determination section that determines whether to make the current thread wait until the reference thread reaches the second synchronization point depending on the waiting time and the magnitude of the quality difference.

12 Claims, 11 Drawing Sheets

(56) References Cited

U.S. PATENT DOCUMENTS

| | | | |
|---|---|---|---|
| 2007/0240158 A1* | 10/2007 | Chaudhry et al. | 718/102 |
| 2007/0286288 A1* | 12/2007 | Smith et al. | 375/240.24 |
| 2008/0095244 A1* | 4/2008 | Kim et al. | 375/240.24 |
| 2008/0155546 A1* | 6/2008 | Ruemmler | 718/102 |
| 2008/0219349 A1* | 9/2008 | Huang et al. | 375/240.15 |
| 2009/0016450 A1* | 1/2009 | Wang et al. | 375/240.29 |
| 2009/0049323 A1* | 2/2009 | Imark et al. | 713/375 |

FOREIGN PATENT DOCUMENTS

| | | |
|---|---|---|
| JP | 9-305546 A | 11/1997 |
| JP | 11-224205 A | 8/1999 |
| JP | 2000010802 A | 1/2000 |
| JP | 2000261797 A | 9/2000 |
| JP | 2004517569 A | 6/2004 |
| JP | 2005078244 A | 3/2005 |
| JP | 2005094054 A | 4/2005 |
| JP | 2006039625 A | 2/2006 |

OTHER PUBLICATIONS

Adve, Vikram, "Analyzing the Behavior and Performance of Parallel Programs", University of Wisconsin-Madison, Dec. 1993.*

International Search Report for PCT/JP2009/050397 mailed Mar. 17, 2009.

ITU-T Recommendation H. 264, "Advanced video coding for generic audiovisual services", Mar. 2005.

Keng-Pang Lim et al.,"Text Description of Joint Model Reference Encoding Methods and Decoding Concealment Methods", Study of ISO/IEC 14496-10 and ISO/IEC 14496-5/AMD6, Joint Video Team (JVT) of ISO/IEC MPEG and ITU-T VCEG, JVT-X101, Jul. 2007.

T. Moriyoshi et al., "Parallelization of Software H.264 Encoder", D-11-33 , Institute of Electronics, Information and Communication Engineers (IEICE) General Conference, RM-9310, 2006.

* cited by examiner

FIG.9

| EVALUATION VALUE | |
|---|---|
| 5 | WAITING TIME > TIME LIMIT ÷ 2 |
| 4 | WAITING TIME ≒ TIME LIMIT ÷ 2 |
| 3 | WAITING TIME = TIME LIMIT |
| 2 | WAITING TIME ≒ TIME LIMIT × 2 |
| 1 | WAITING TIME < TIME LIMIT × 2 |

SYNCHRONIZATION CONTROL METHOD AND INFORMATION PROCESSING DEVICE

The present application is the National Phase of PCT/JP2009/050397, filed Jan. 14, 2009, which claims priority from Japanese Patent Application No. 2008-008321 filed on Jan. 17, 2008, the entire contents of which being incorporated herein by reference.

TECHNICAL FIELD

The present invention relates to synchronization control when a plurality of threads are processed in parallel.

BACKGROUND ART

In an information processing device, one way to execute a process corresponding to one application is to execute a plurality of threads (unit process) of the process in parallel. The method is called multithreading.

For multithreading, a program is so designed that out of a plurality of threads, related threads are in synchronization with each other. Therefore, it is possible to efficiently execute the process. Such a multithreading technique is disclosed, for example, in PTL 1, which is described below.

CITATION LIST

Patent Literature

{PTL 1} JP-A-10-187465
{NPL 1} ITU-T Recommendation H.264, Advanced Video Coding for Generic Audiovisual Services, March 2003
{NPL 2} K.-P. Lim, G. Sullivan, T. Wiegand, Text description of joint model reference encoding methods and decoding concealment methods, Joint Video Team of ISO/IEC MPEG and ITU-T VCEG Document, JVT-X101, Geneva, June. 2007
{NPL 3} Tatsuji Moriyoshi, Takashi Miyazaki "Parallelization of Software H.264 Encoder," D-11-33, Institute of Electronics, Information and Communication Engineers (IEICE) General Conference, RM-9310, 2006

SUMMARY OF INVENTION

Technical Problem

According to multithreading, as described above, parallel processing of threads leads to improvements in the efficiency of the process as a whole. However, a thread that is in synchronization with another thread may take a longer time to be processed than prescribed. An example thereof will be described below.

Assume that there are two threads A and B to be processed in parallel and that out of the threads A and B, the thread A, at synchronization point "a" of the thread, refers to data that is at synchronization point "b" of another thread B. Also assume that the thread A reaches the synchronization point "a" before the thread B does, i.e. the thread A's process that goes on until the synchronization point "a" is completed earlier than the thread B's process that goes on until the synchronization point "b". In this case, the thread A waits until the thread B reaches the synchronization point "b". The more the thread B delays, the longer the waiting time of the thread A becomes. As a result, the processing time of the entire process becomes longer.

Meanwhile, to prevent the processing time from becoming longer, one option may be to set in advance a timer such as the one employed in the above PTL 1. However, in the above example, even if the thread A restarts the process after time by set the timer has come through, the processing results obtained from the thread A are not necessarily appropriate because it is unknown whether the data referred to from the thread B at a time when the time by set the timer come through is useful for the thread A. If the processing results obtained are not appropriate, the thread A's attempt to wait is useless as a result.

An object of the present invention is therefore to provide a synchronization control method and an information processing device for efficiently processing threads in parallel in multithreading.

Solution to Problem

A synchronization control method of the present invention includes the steps of: executing a current thread and a reference thread whose data is referred to by the current thread in parallel; determining whether the reference thread reaches a second synchronization point when the current thread reaches a first synchronization point; calculating the time needed for the reference thread to reach the second synchronization point as a waiting time of the current thread when the result of determination is negative; estimating a quality difference between data that the current thread generates by referring to processing data at the second synchronization point of the reference thread and data that the current thread generates without referring to the processing data; and determining whether to make the current thread wait until the reference thread reaches the second synchronization point depending on the waiting time and the magnitude of the quality difference.

An information processing device of the present invention includes: a synchronization control section that executes a current thread and a reference thread whose data is referred to by the current thread in parallel; a waiting time calculation section that calculates the time needed for the reference thread to reach a second synchronization point as a waiting time of the current thread when the reference thread does not reach the second synchronization point at a time when the current thread reaches a first synchronization point; a quality difference calculation section that estimates a quality difference between data that the current thread generates by referring to processing data at the second synchronization point of the reference thread and data that the current thread generates without referring to the processing data; and a synchronization determination section that determines whether to make the current thread wait until the reference thread reaches the second synchronization point depending on the waiting time and the magnitude of the quality difference.

Advantageous Effects of Invention

According to the present invention, it is possible to efficiently process threads in parallel in multithreading.

BRIEF DESCRIPTION OF DRAWINGS

FIG. 9 An explanatory diagram concerning evaluation values of waiting time according to the fourth embodiment of the present invention.

REFERENCE SIGNS LIST

Figure 1:
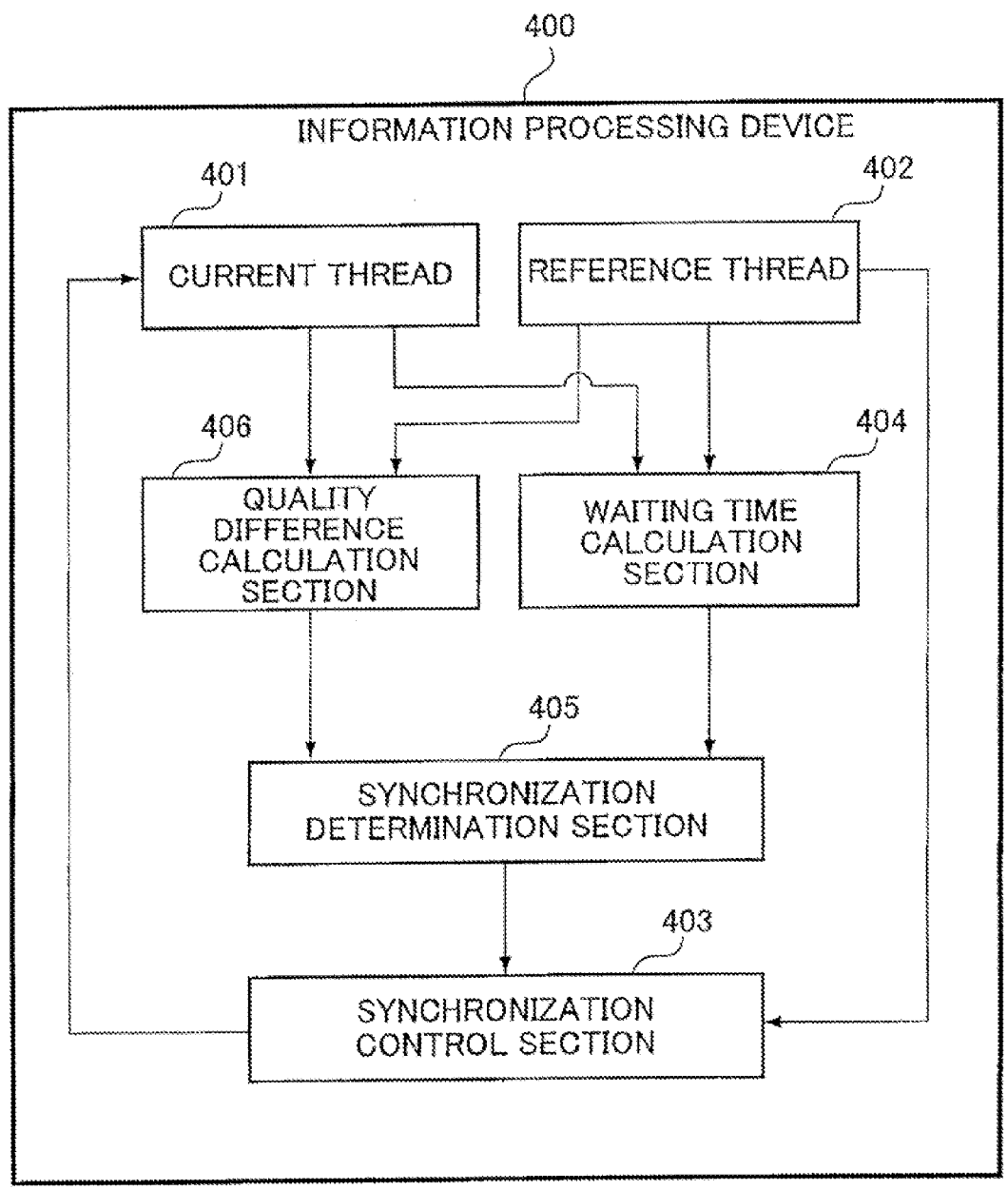
FIG. 1 A block diagram illustrating the configuration of an information processing device according to a first embodiment of the present invention.

400: Information processing device
401: Current thread
402: Reference thread
403: Synchronization control section
404: Waiting time calculation section
405: Synchronization determination section
406: Quality difference calculation section

DESCRIPTION OF EMBODIMENTS

First Embodiment

FIG. 1 shows an information processing device 400 according to a first embodiment of the present invention. The information processing device 400 includes a current thread 401, a reference thread 402, a synchronization control section 403, a waiting time calculation section 404, a synchronization determination section 405 and a quality difference calculation section 406. The information processing device 400 is a computer that supports multithreading and executes the current thread 401 and the reference thread 402 in parallel.

The current thread 401 carries out a process by referring to the data that the reference thread 402 handles, such as the processing results or to-be-processed data of the reference thread 402. A synchronization point "A" is set for the current thread 401, and a synchronization point "B" is set for the reference thread 402. The synchronization point "A" corresponds to a first synchronization point of the present invention, and the synchronization point "B" corresponds to a second synchronization point.

If the reference thread 402 does not reach the synchronization point "B" yet at a time when the current thread 401 has reached the synchronization point "A", the waiting time calculation section 404 calculates the time for which the current thread 401 waits until the reference thread 402 reaches the synchronization point "B". For example, the waiting time can be calculated from the product of the number of remaining processing blocks that go on as far as the synchronization point "B" in the reference thread 402 and the time needed for one processing block to be processed.

The quality difference calculation section 406 estimates a quality difference between data of a case in which the current thread 401 that has reached the synchronization point "A" refers to data that is at synchronization point "B" of the reference thread 402 and data of a case in which the current thread 401 refers to data of the reference thread 402 at the current moment. The quality difference is dependent on the progress of the current thread 401, a control parameter of a block processed by each thread, the relationship between processing blocks or the like. If the appropriate processing results are not obtained in the current thread 401 without the data that is at synchronization point "B" of the reference thread 402, the quality difference becomes larger. If the appropriate processing results are obtained in the current thread 401 without the above data, the quality difference is small.

The synchronization determination section 405 makes a determination as to whether to make the current thread 401 wait to get the current thread 401 synchronized with the reference thread 402 on the basis of the waiting time calculated by the waiting time calculation section 404 and the quality difference estimated by the quality difference calculation section 406.

In accordance with the result of determination by the synchronization determination section 405, the synchronization control section 403 controls the progress of the current thread 401. That is, when the synchronization determination section 405 determines to carry out synchronization, the synchronization control section 403 makes the current thread 401 wait until the reference thread 402 reaches a predetermined synchronization point. When the synchronization determination section 405 determines not to carry out synchronization, the synchronization control section 403 allows the current thread 401 to continue the process without waiting.

Figure 2:
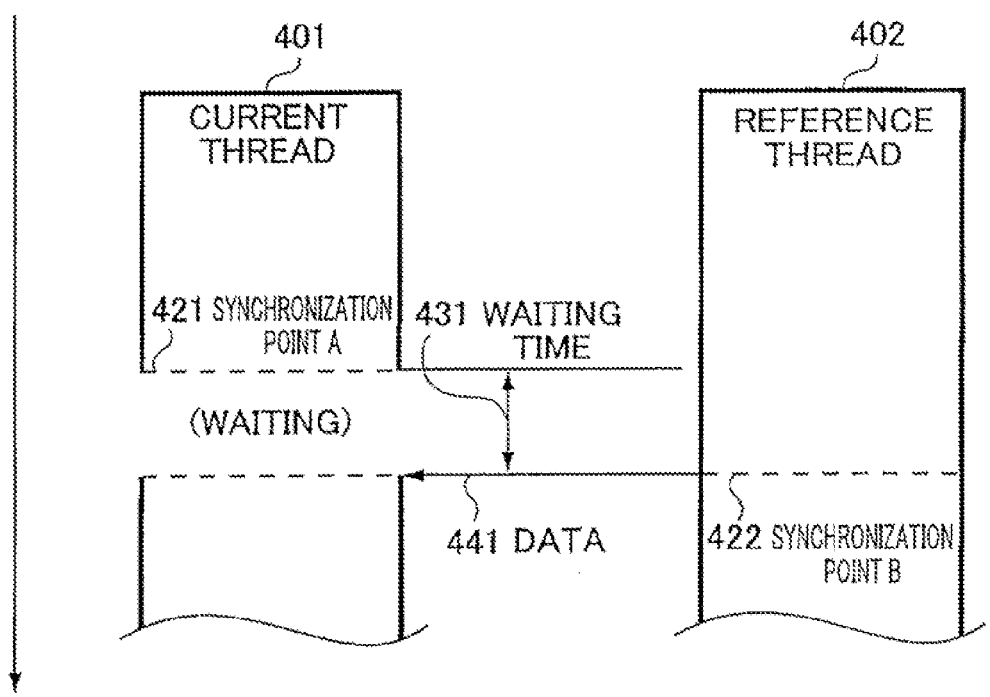
FIG. 2 An explanatory diagram concerning parallel processing of threads according to the first embodiment of the present invention.

FIG. 2 schematically illustrates how the current thread 401 and the reference thread 402 synchronize with each other. When it is determined that the current thread 401 and the reference thread 402 should be synchronized with each other at a time when the current thread 401 has reached the synchronization point A421, the current thread 401 is forced to wait until the reference thread 402 reaches the synchronization point B421.

In FIG. 2, the time needed for the reference thread 402 to go from the synchronization point A421 to the synchronization point B421 corresponds to a waiting time 431. When the reference thread 402 reaches the synchronization point B421, the current thread 401 restarts the process by referring to data 441 at the time. The data 441 is the equivalent of the processing data at the first synchronization point of the present invention.

Figure 3:
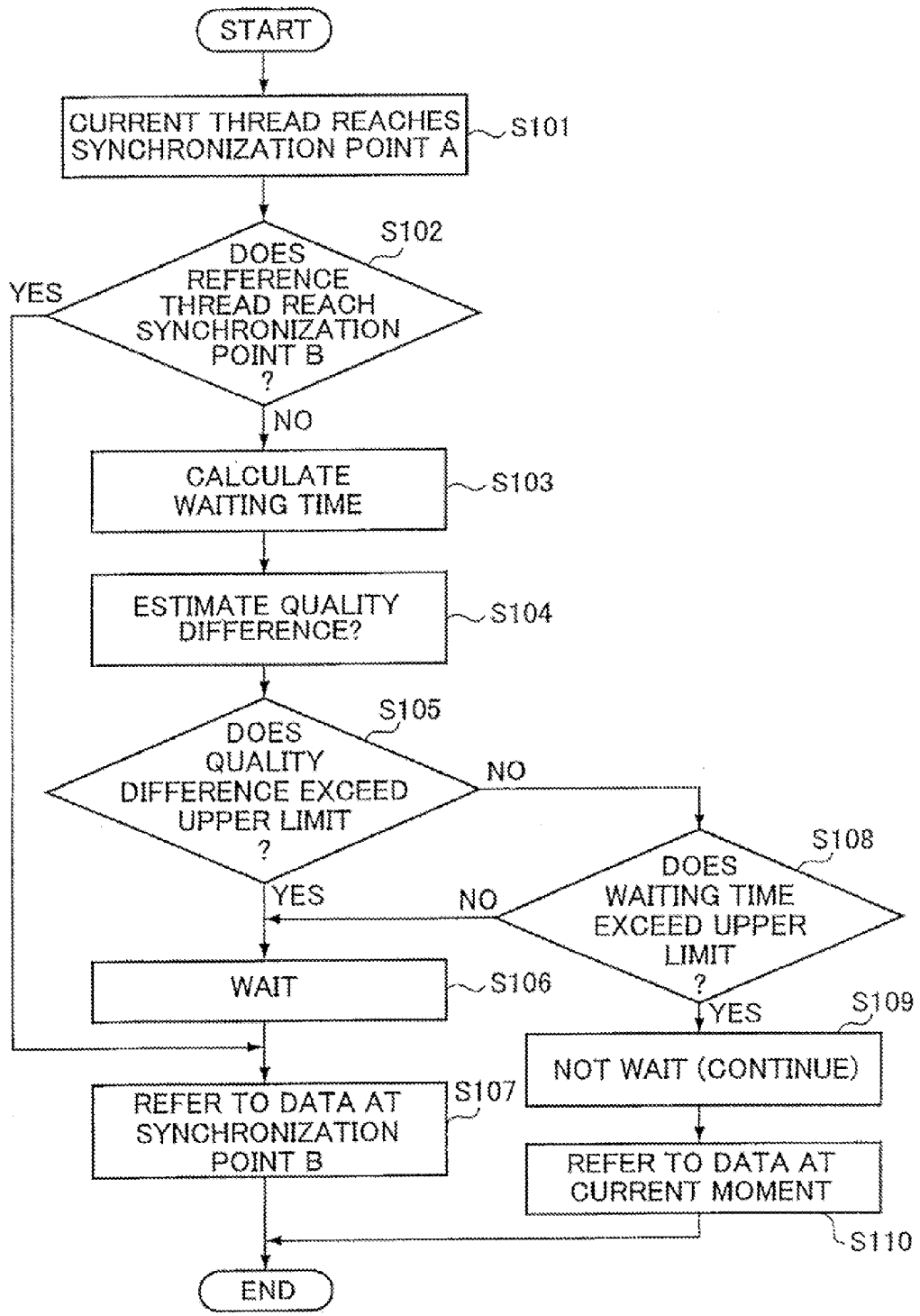
FIG. 3 A flowchart concerning the operation of the first embodiment of the present invention.

The operation of the present embodiment will be described with reference to a flowchart illustrated in FIG. 3 and FIGS. 1 and 2. When the current thread 401 being executed in parallel with the reference thread 402 reaches the synchronization point A421 (Step S101), the synchronization control section 403 confirms whether the reference thread 402, another thread, has reached the synchronization point B422. When the reference thread 402 has reached the synchronization point B422 (Step S102: Yes), the synchronization control section 403 controls the current thread 401 in a way that continues the process by referring to the data 411 at the synchronization point B422 (Step S107).

When the reference thread 402 has not yet reached the synchronization point B422 (Step S102: No), the waiting time calculation section 404 calculates the waiting time 431, the time needed for the reference thread 402 to reach the synchronization point B421 (Step S103). As described above, the difference in time between the synchronization point A421 and the synchronization point B421 corresponds to the waiting time 431.

The quality difference calculation section 406 estimates the quality difference between the data that the current thread 401 generates by referring to the data 441 at the synchronization point B422 of the reference thread 402 and the data that the current thread 401 generates by referring to the data at the current moment of the reference thread 402 (Step S104).

The synchronization determination section 405 compares the quality difference estimated by the quality difference calculation section 406 with the preset upper limit. When the results of comparison show that the quality difference exceeds the upper limit (Step S105: Yes), the synchronization determination section 405 determines to carry out synchronization, i.e. make the current thread 401 wait until the reference thread 402 reaches the synchronization point B422 (Step S106). That is, the synchronization determination section 405 determines that it is necessary to refer to the data 441 in order to prevent the deterioration of the quality of processing by the current thread 401 that has passed the synchronization point A421 because the quality difference is relatively large (Determination I).

After recognizing the above result of determination, the synchronization control section 403 suspends the execution of the current thread 401 until the reference thread 402 reaches the synchronization point B422. After that, when the data 441 is acquired from the reference thread 402, the synchronization control section 403 controls the current thread 401 in a way that restarts the process by referring to the data 441 (Step S107).

Meanwhile, when the quality difference estimated is below the upper limit (Step S105: No), the synchronization determination section 405 compares the waiting time 431 calculated by the waiting time calculation section 404 with the preset upper limit. When the results of comparison show that the waiting time 431 is less than the upper limit (Step S107: No), the synchronization determination section 405 determines to make the current thread 401 wait (Step S106). That is, the synchronization determination section 405 determines to make the current thread 401 wait because the reference thread 402 would reach the synchronization point B422 in a short time, even though it is not necessary for the current thread 401 to refer to the data 441 because the quality difference is small (Determination II).

When the waiting time exceeds the upper limit (Step S107: Yes), the synchronization determination section 405 determines not to make the current thread 401 wait (Step S109). That is, the synchronization determination section 405 determines to continue the process by skipping the long waiting time 431 since it is not necessary for the current thread 401 to refer to the data 441 (Determination III). After recognizing the above result of determination, the synchronization control section 403 controls the current thread 401 in a way that continues the current thread 401 by referring to the data at the current moment of the reference thread 402 (Step S110).

Figure 4:
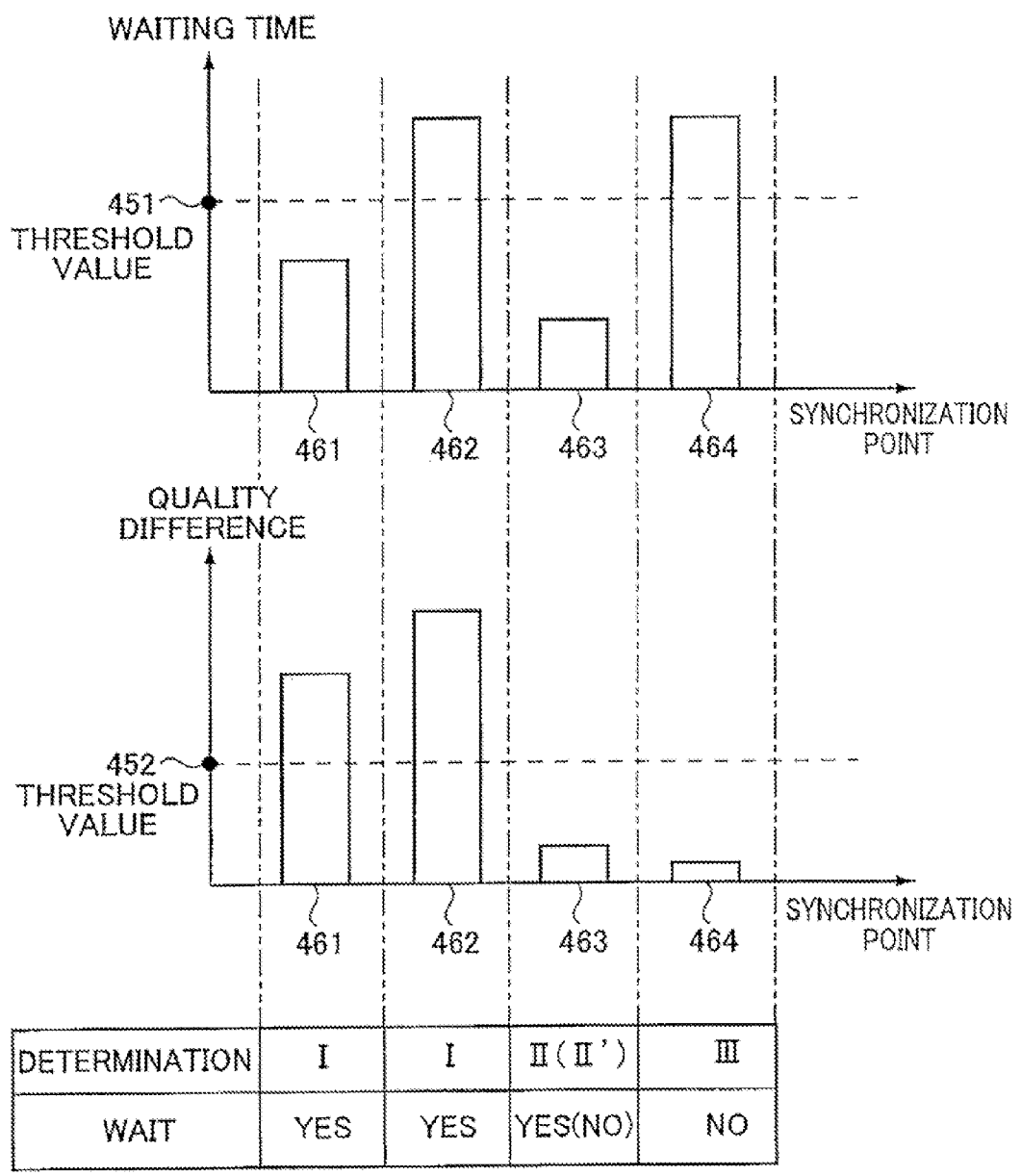
FIG. 4 An explanatory diagram concerning synchronization determination according to the first embodiment of the present invention.

FIG. 4 shows a specific example of the above Determinations I, II and III. The graphs shown in the diagram show the waiting time (431) and the degree of the quality difference obtained at four synchronization points 461, 462, 463 and 464 in the current thread 401. A waiting time threshold value 451 and a quality difference threshold value 452 correspond to the above-described upper limit of the waiting time and the above-described upper limit of the quality difference, respectively.

At the synchronization points 461 and 462, the quality difference exceeds the upper limit. Therefore, the current thread 401 is forced to wait on the basis of the above Determination I. At the synchronization point 463, the quality difference does not exceed the upper limit. However, the waiting time is short. Therefore, the current thread 401 is forced to wait on the basis of the above Determination II. In the above cases, it is possible for the current thread 401 to produce the high-quality data after the process of waiting thanks to the process of referring to the data 441 at the synchronization point B422.

Meanwhile, at the synchronization point 464, the waiting time is longer despite the smaller quality difference. In this case, because of the above Determination III, the current thread 401 is forced to go on without waiting. Accordingly, the current thread 401 continues the process by referring to the data at the current moment of the reference thread 402. However, since the quality difference that is estimated in advance is small, the data quality of the processing results do not deteriorate. The above way of controlling prevents the process of the current thread 401 from being delayed by the process of synchronizing with the reference thread 402.

Figure 5:
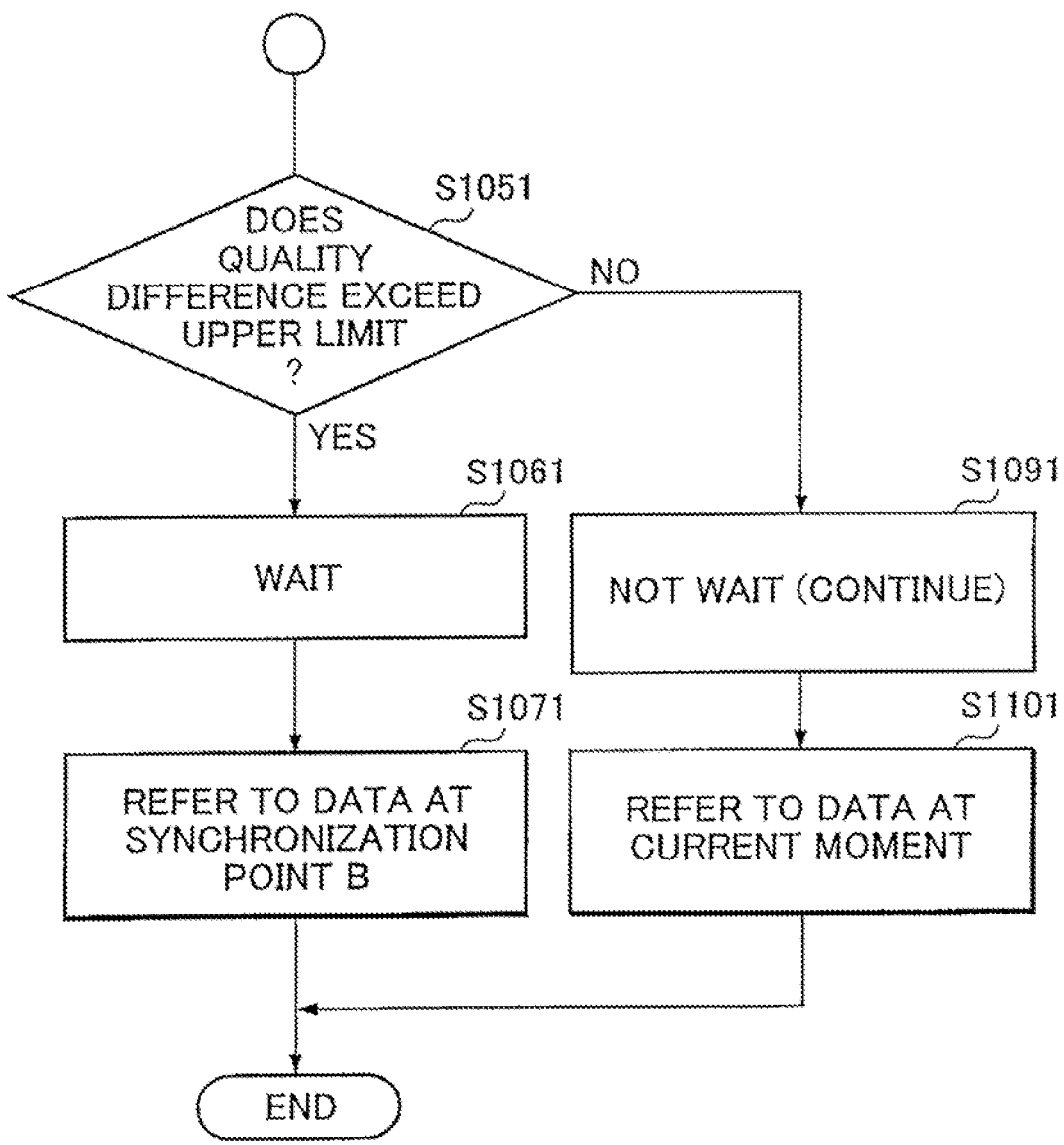
FIG. 5 A flowchart concerning another example of the first embodiment of the present invention.

Incidentally, the determination by the synchronization determination section 405 may be made based only on the quality difference. In this case, the waiting time calculation section 404 can be omitted from the information processing device 400. The procedure of such a way of determination is illustrated in FIG. 5. The processes of step S1051, S1061 and S1071 are the same as those of step S105, S106 and S107 in FIG. 3. That is, when the quality difference exceeds the upper limit, the current thread 401 is forced to wait.

In the process of controlling of FIG. 5, the synchronization determination section 405 determines not to make the current thread 401 wait (Step S1091) when the quality difference is small (Step S1051: No). Accordingly, the current thread 401 continues the process on the basis of the data at the current moment of the reference thread 402 (Step S1101). At the synchronization point 463 illustrated in FIG. 4, it is determined that the current thread 401 is to be forced to wait in the process of controlling of FIG. 3 (Determination II). However, in the process of controlling of FIG. 5, it is determined that current thread 401 is not to be forced to wait (Determination II'). Therefore, the procedure of FIG. 5 is suitable for preventing the delay of the current thread 401.

Incidentally, in the case described above, when the current thread 401 does not wait for the reference thread 402, the current thread 401 refers to the data at the current moment of the reference thread 402. However, in other cases, for example, the current thread 401 may refer to the data already processed by the reference thread 402 or the data prepared in advance.

Second Embodiment

A second embodiment of the present invention will be described. The configuration of the information processing device 400 of the present embodiment is basically the same as that of the above-described embodiment (FIG. 1). The difference between the present and above embodiments is about how the synchronization determination section 405 operates. The synchronization determination section 405 of the present embodiment shortens or lengthens the waiting time calculated by the waiting time calculation section 404 according to the magnitude of the quality difference. The synchronization determination section 405 then applies the adjusted value as the waiting time of the current thread 401. Hereinafter, the waiting time adjusted is referred to as a time-out value.

Figure 6:
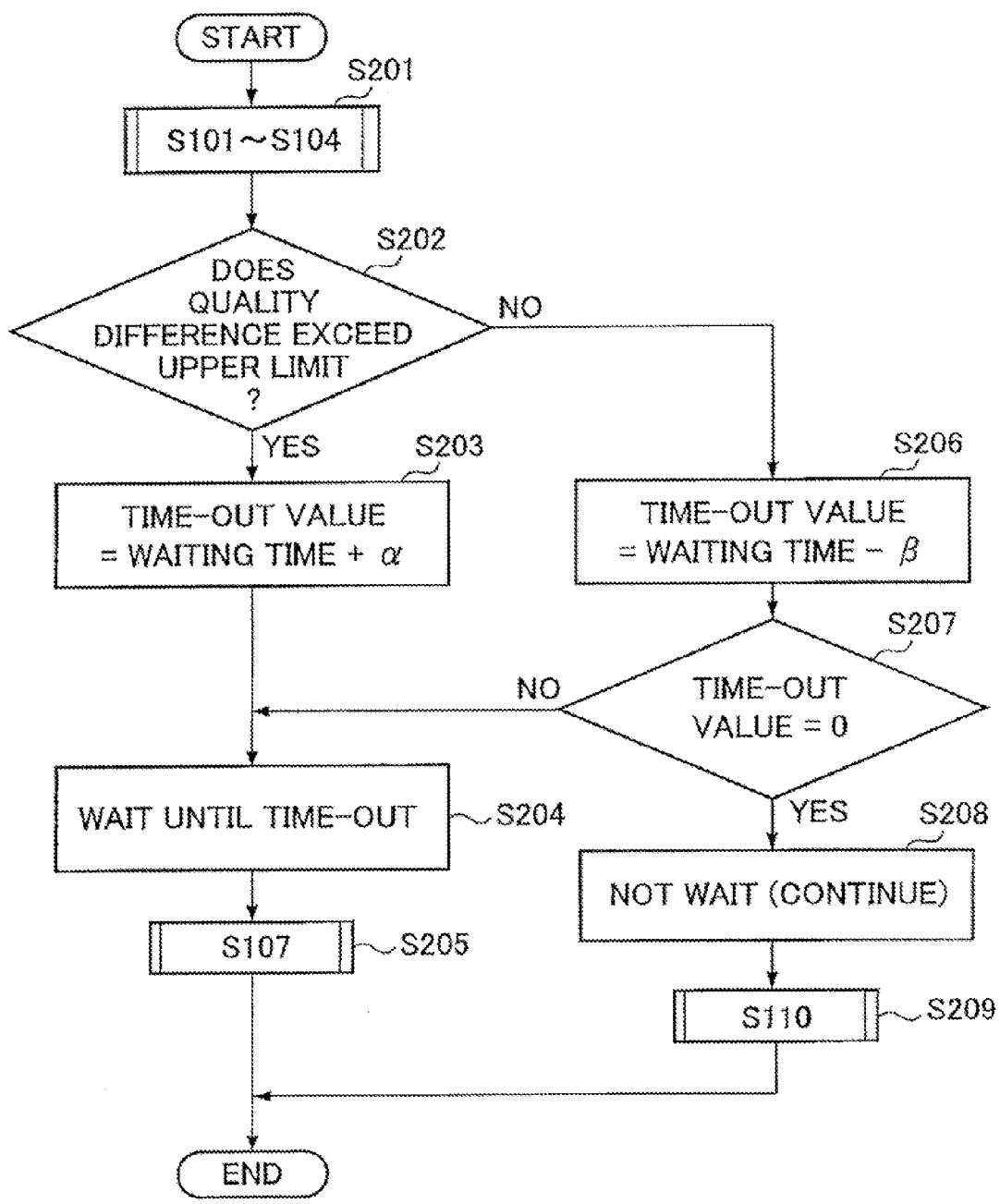
FIG. 6 A flowchart concerning the operation of a second embodiment of the present invention.

The operation of the present embodiment will be described with reference to a flowchart of FIG. 6 and FIGS. 1 and 2. When the current thread 401 reaches the synchronization point A421, then the same processes as those of step S101 to S104 of the above-described embodiment are performed (Step S201). That is, when the reference thread 402 does not reach the synchronization point B422 at the current moment, the waiting time and the quality difference are estimated.

When the estimated quality difference exceeds the upper limit (Step S202: Yes), the synchronization determination section 405 adds a predetermined value α(α>0) to the waiting time T and sets the resultant value as the time-out value (Step S203). The synchronization control section 403 makes the current thread 401 wait until the time-out value (T+α) runs out (Step S204). Then, in the same way as in the process of step S107 of the above-described embodiment, the synchronization control section 403 restarts the current thread 401 using the data 441 of the reference thread 402 (Step S205).

Meanwhile, when the quality difference is less than the upper limit (Step S202: No), the synchronization determination section 405 subtracts a predetermined value β(0<β<T) from the waiting time T and sets the resultant value as the time-out value (Step S206). When the time-out value (T−β) is greater than zero (Step S202: No), the synchronization control section 403 makes the current thread 401 wait until the time runs out (Step S204).

When the time-out value (T−β) is zero (Step S207: Yes), the synchronization determination section 405 determines not to make the current thread 401 wait (Step S208). In this case, in the same way as in the process of step S110 of the above-described embodiment, the synchronization control section 403 allows the current thread 401 to go on without waiting (Step S209).

According to the present embodiment, the waiting time is lengthened when the quality difference is large, thereby ensuring that the current thread 401 captures the data 441 at the synchronization point B422. The lengthening of the waiting time is useful when the reference thread 402 is delayed for some reason. Moreover, when the quality difference is small, it is possible to make fine adjustments to shorten the waiting time. Therefore, it is possible to prevent the process of the current thread 401 from dragging on. It is also possible for the current thread 401 to carry out the process by referring to the data processed by the reference thread 402 between the synchronization point A421 and the synchronization point B422.

Third Embodiment

A third embodiment of the present invention will be described. The configuration of the information processing device 400 of the present embodiment is basically the same as that of the above-described embodiment (FIG. 1). The present embodiment and the first embodiment are different in that the waiting time calculation section 404 recalculates the waiting time when the current thread 401 is waiting.

Figure 7:
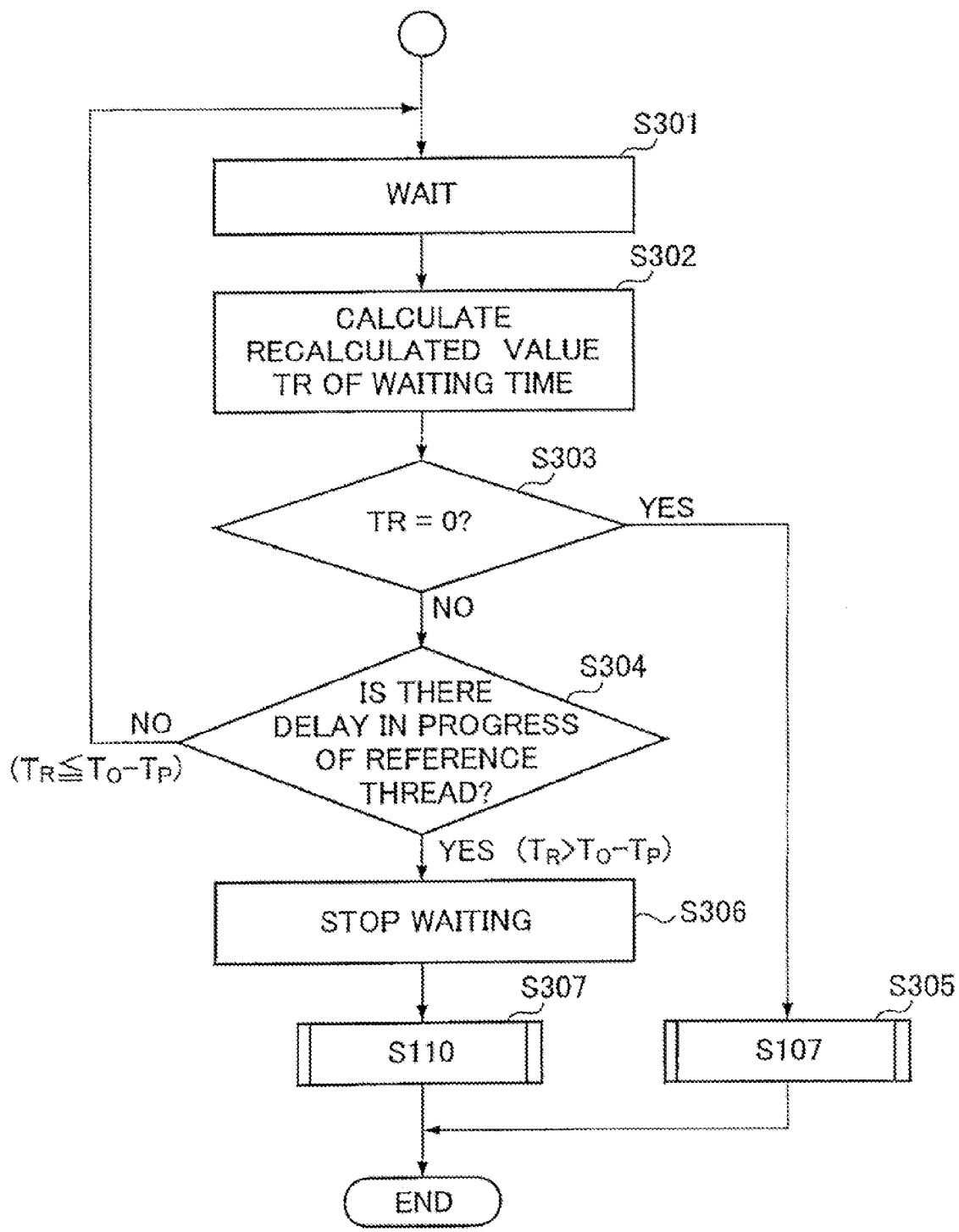
FIG. 7 A flowchart concerning the operation of a third embodiment of the present invention.

The operation of the present embodiment will be described with reference to a flowchart of FIG. 7 and FIGS. 1 and 2. What are described here are the processes following the step (Step S106 in FIG. 3 or Step S1061 in FIG. 5) at which the synchronization determination section 405 determines to make the current thread 401 wait.

When the current thread 401 is waiting (Step S301), the waiting time calculation section 404 recalculates the waiting time (Step S302). The value recalculated corresponds to the time needed for the reference thread 402 to reach the synchronization point B422 at a time when a predetermined period of time has passed since the synchronization point A421. Accordingly, when there is no delay in the progress of the reference thread 402 after the synchronization point A421, the waiting time $T_R$ to be recalculated is given by the following equation (1), where "$T_0$" is the waiting time 431 calculated at the synchronization point A421 and "$T_P$" represents the time that has elapsed since the synchronization point A421.

$$T_R = T_0 - T_P \quad (1)$$

After the recalculated value $T_R$ is calculated, the synchronization determination section 405 confirms whether there is delay in the progress of the reference thread 402, which is determined by the following equations (2) and (3).

$$T_R \leq T_0 - T_P \quad (2)$$

$$T_R > T_0 - T_P \quad (3)$$

When the recalculated value $T_R$, which is greater than or equal to zero, satisfies the above equation (2), the synchronization determination section 405 determines that there is no delay in the progress of the reference thread 402 (Step S303: No, S304: No). In this case, the synchronization determination section 405 makes the current thread 401 wait while recalculating at predetermined intervals (Steps S301 and S302). When the recalculated value $T_R$ becomes zero (Step S303; Yes), the synchronization determination section 405 restarts the current thread 401 by referring to the data 441 at the synchronization point B422 (Step S305); the process is the same as that of step S107 (FIG. 3) of the above-described first embodiment.

Meanwhile, when the recalculated value $T_R$ satisfies the above equation (3), the synchronization determination section 405 determines that there is delay in the progress of the reference thread 402 (Step S304: Yes). In this case, the synchronization determination section 405 stops the waiting of the current thread 401 in order to prevent the restarting of the current thread 401 from being delayed (Step S306) and restarts the current thread 401 by referring to the data at the current moment of the reference thread 402 (Step S307). The restarting operation is the same as that of step S110 (FIG. 3) of the above-described first embodiment.

As described above, according to the present embodiment, even if there is delay in the progress of the reference thread 402 due to unexpected events such as interrupt processes, it is possible to prevent the restarting of the standby current thread 401 from being delayed.

Fourth Embodiment

A fourth embodiment of the present invention will be described. The configuration of the information processing device 400 of the present embodiment is basically the same as that of the above-described embodiment (FIG. 1). According to the present embodiment, the information processing device 400 is expected to carry out threads concerning image processing.

Figure 8:
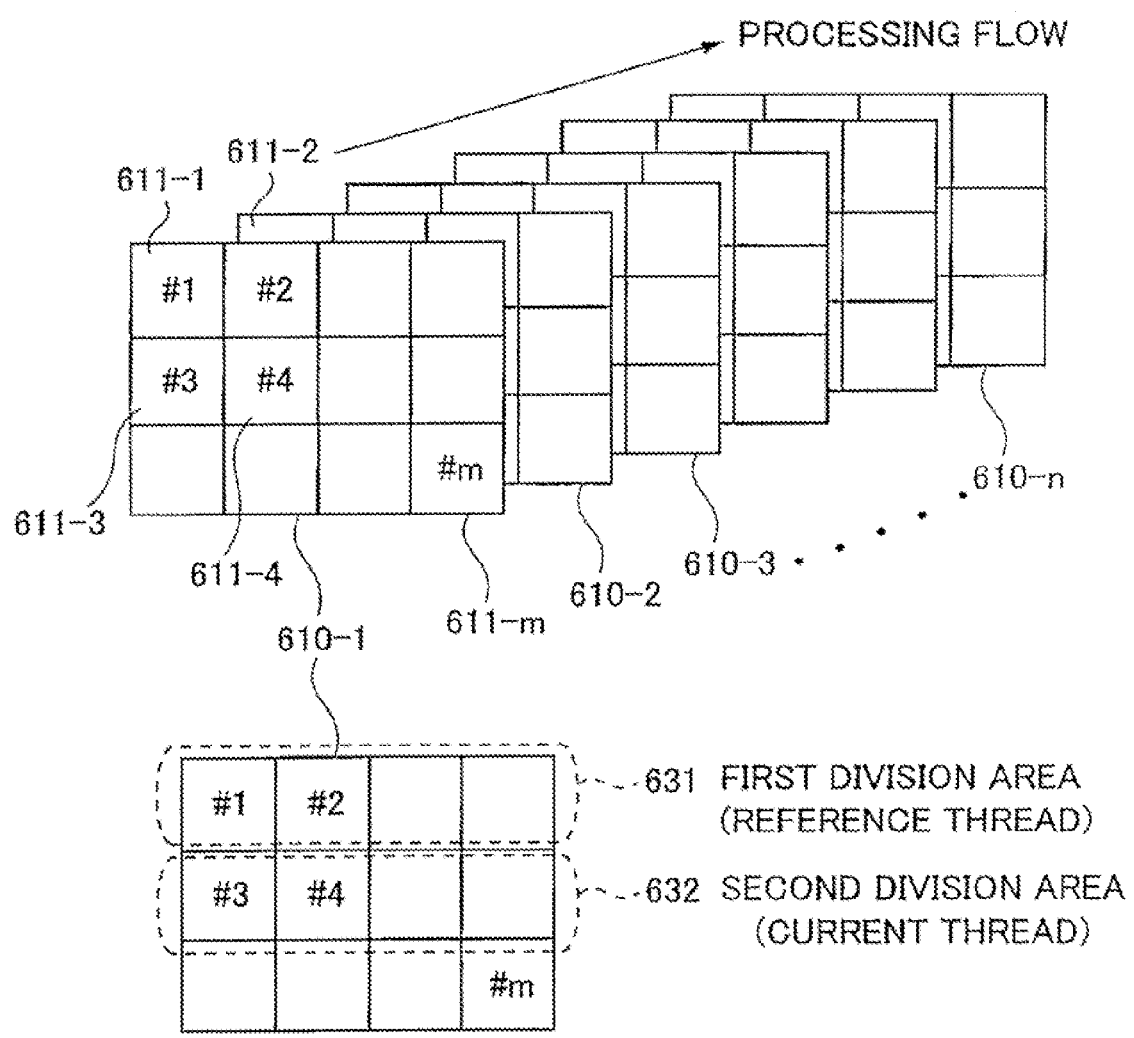
FIG. 8 An explanatory diagram concerning a fourth embodiment of the present invention.

FIG. 8 illustrates image frames that are processed in the information processing device 400. A to-be-processed image consists of successive n image frames (a first frame 610-1 to a n-th frame 610-n). Each of the frames 610-1 to 610-n is divided into m blocks 611-1 to 611-m. Each of the blocks (611-1 to 611-m) in the frames is allocated to any one of a plurality of threads before being processed. For example, it is possible to divide a frame into a plurality of areas and allocate each of the divided areas to a thread.

FIG. 9 shows an example of how to divide a frame. In the example illustrated in the diagram, the frame is divided up line by line in the scanning direction of the frame, i.e. in the lateral direction of the frame; what are formed from top to bottom are a first division area 631 and a second division area 632. The reference thread (402) and the current thread (401)

are allocated to the first division area 631 and the second division area 632, respectively. The allocation is intended to process the second division area 632 while referring to the processing results of the first division area 631.

The procedures of the above-described embodiments (FIGS. 3 and 5 to 7) can be applied to the operation of the present embodiment. For example, the waiting time calculation section 404 can calculate the waiting time based on the numbers or positions of a block being processed by the current thread 401 and a block being processed by the reference thread 402. For example, the quality difference calculation section 406 can calculate the quality difference based on the position in space of a block being processed or a synchronization control state of the preceding frames.

An example of the operation of the synchronization determination section 405 of the present embodiment will be described. Suppose that the waiting time and the quality difference are evaluated on N stages (a N-point scale), where N is an integer greater than or equal to 2. For the quality difference, "N" represents the largest quality difference, and "1" the smallest quality difference. For the waiting time, "N" represents the longest waiting time, and "1" the shortest waiting time.

When the evaluation result of the waiting time does not exceed the evaluation result of the quality difference, the synchronization determination section 405, for example, determines to synchronize, i.e. makes the current thread 401 wait. More specifically, when the evaluation value of the waiting time and the evaluation value of the quality difference are "2" and "1," respectively, the synchronization determination section 405 determines not to synchronize. When the evaluation value of the waiting time and the evaluation value of the quality difference are "4" and "5," respectively, the synchronization determination section 405 determines to synchronize. Such a way of controlling can reduce a drop in the quality of image and prevent an increase in the total processing time.

Incidentally, in the process of evaluating the waiting time, an offset value can be added when necessary depending on how the process proceeds or in response to instructions from a user. Therefore, it is possible to flexibly control the determination process pertaining to synchronization.

There is a time limit for image processing in a real-time moving image process and other processes. For example, when 30 image frames are produced per second, it is necessary to complete the decoding of one frame within 1/30 seconds. If there is enough time for processing, the relatively longer waiting time does not matter. If there is not enough time for processing, even the shorter waiting time matters. Accordingly, it is preferable that the evaluation of the waiting time be conducted based on the time limit, not merely on the absolute value of the waiting time.

The following describes an example of an evaluation method of the waiting time with the use of the time limit. First, the time limit of the thread is calculated from the time limit of frame processing. For example, one frame has 5×2 blocks; when 5 blocks are processed in parallel at one time in two threads, the time limit of each thread is equal to the time limit of the frame. Then, the remaining time is calculated by subtracting the time that has elapsed up to the current block from the time limit of the thread. Subsequently, the remaining time is divided by the number of remaining blocks to calculate the time limit of one block, the time that can be used for processing the remaining blocks. For example, when 5 blocks are processed per thread, the time limit of one block is calculated by dividing the remaining time by "2" the number of remaining processing blocks, if the processing of the third block is completed.

Meanwhile, in the process of calculating the waiting time, the processing time of one block in the reference thread 402 is calculated from the time that has elapsed up to the present point in time and the number of blocks processed. The waiting time of the current thread 401 is calculated by multiplying the calculated processing time by the number of blocks for which the current thread 401 should wait. For example, if there are two remaining blocks before the reference thread 402 reaches the synchronization point B422, the waiting time of the current thread 401 is calculated by multiplying the processing time of one block by two. When the waiting time calculated in the above manner is evaluated, the waiting time is compared with the time limit of one block (the processing time of one block).

FIG. 9 shows an example of how to set evaluation values of the waiting time. In the example illustrated in the diagram, the waiting time is supposed to be evaluated on five stages (a 5-point scale). The evaluation value comes to "3" when the waiting time is substantially equal to the time limit of one block. The evaluation value comes to "4" when the waiting time is longer than the time limit and the difference between both is substantially equal to the time limit, while the evaluation value is "5" when the difference is two times greater than the time limit. The evaluation value is "2" when the waiting time is shorter than the time limit and the difference between both is substantially equal to the time limit, while the evaluation value is "1" when the difference is two times greater than the block processing time.

Incidentally, in the above example, the time limit of one block is calculated by dividing the remaining time by the number of remaining blocks. Instead, the time limit of one block may be calculated by dividing the total processing time of a thread by the number of blocks of the thread. In the former case, the time limit varies according to the progress of frame processing. In the latter case, the time limit remains unchanged until the end of the frame.

Figure 10:
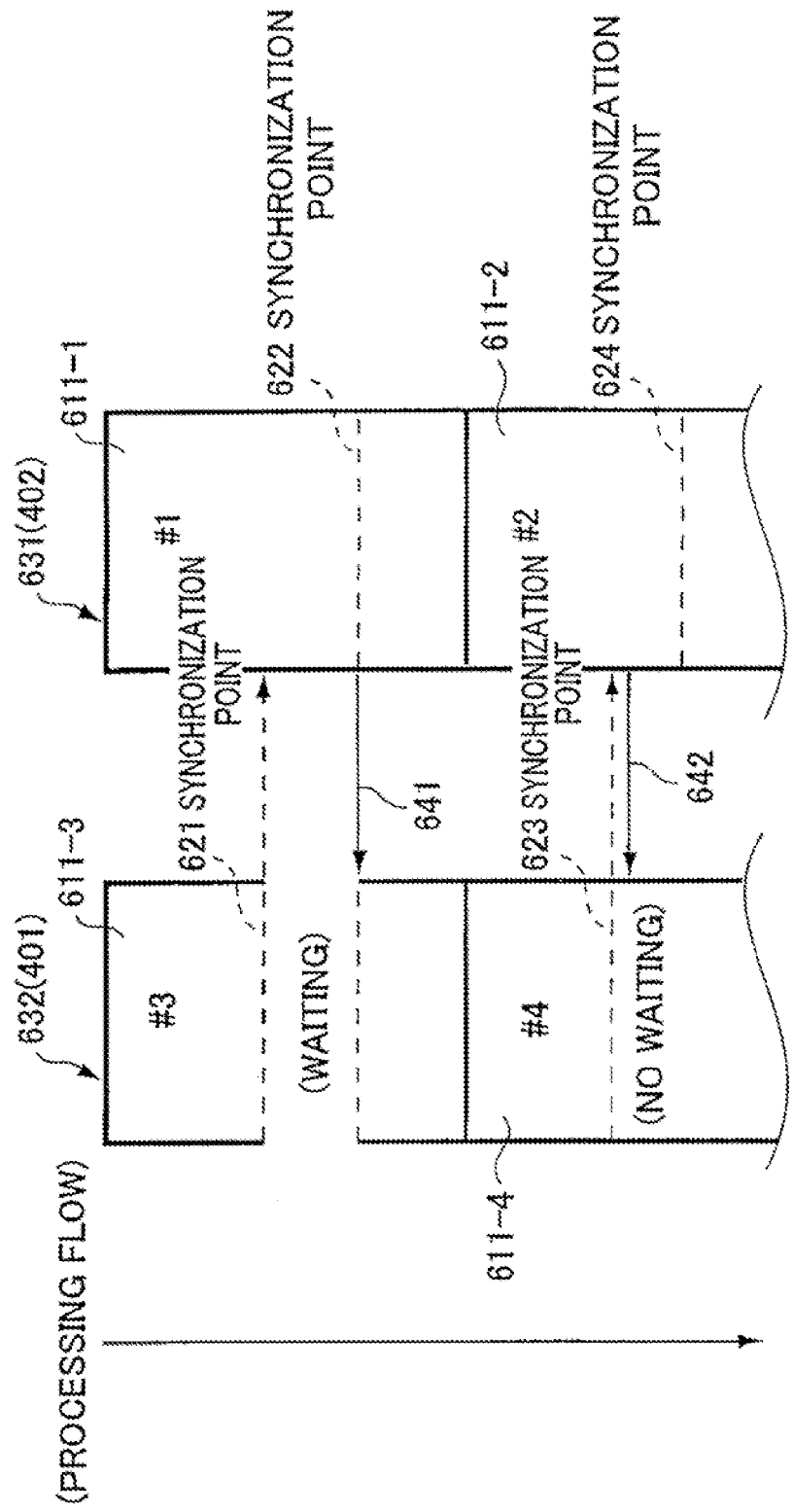
FIG. 10 An explanatory diagram concerning parallel processing of threads according to the fourth embodiment of the present invention.

FIG. 10 shows how the parallel processing of the first and second division areas 631 and 632 (FIG. 8) proceeds in one frame. The third block 611-3 and the subsequent fourth block 611-4 are processed by the current thread 401. The first block 611-1 and the subsequent second block 611-2 are processed by the reference thread 402.

Suppose that the third block 611-3 needs data 641 at a synchronization point 622 of the first block 611-1 in the process after a synchronization point 621. In this case, when the third block 611-3 reaches the synchronization point 621, the synchronization control section 403 makes a determination as to whether the third block 611-3 should be forced to wait until the synchronization point 622. Here, assume that the synchronization control section 403 has determined to make the third block 611-3 wait. After waiting, the third block 611-3 restarts the process by referring to the data 641 of the first block 611-1 at the synchronization point 622.

After the process of the third block 611-3 finishes in the second division area 632, the process of the fourth block 611-4 starts. The fourth block 611-4 needs data 642 of the second block 611-2 at a synchronization point 624 in the process after a synchronization point 623. When the fourth block 611-4 reaches the synchronization point 623, the synchronization control section 403 makes a determination as to whether there is a need for waiting. Here, assume that the synchronization control section 403 has determined not to make the current thread 401 wait. In this case, without waiting the data 642 of the second block 611-2, the current thread 401 continues the process that goes on after the synchronization point 623 by referring to the data 642 at the current moment of the reference thread 402.

Incidentally, the data that the current thread 401 refers to when not waiting is not limited to the data 642 at the current moment of the reference thread 402 as described above; the data may be the data processed by the reference thread 402. More specifically, the data that is referred to could be data at a similar position to the data 642 in the first block 611-1 or the data at the synchronization point 622, instead of the data 642 of the second block 611-2.

According to the present embodiment, in the parallel processing in image frames, it is possible to control with both the processing quality of threads and the processing time being taken into account.

As to the fourth embodiment, specific examples will be described in detail. In this case, suppose that the information processing device 400 performs the image processing of a H.264/MPEG-4 AVC type as disclosed in NPL 1 and NPL 2.

Example 1

In the present example, the current and reference threads are a deblocking filter process for macro blocks. The technique of the deblocking filter process is, for example, disclosed in NPL 3. Hereinafter, the deblocking filter process is simply referred to as a "filter process."

In the present example, the dividing format of frames and the allocation method of threads are the same as in FIG. 8. That is, the first division area 631 is allocated to the reference thread 402, and the second division area 632 is allocated to the current thread 401. The data of the reference thread 402 that the current thread 401 is supposed to refer to is pixel values obtained after the filter process.

The waiting time calculation section 404 calculates the waiting time that the filter process of the reference thread 402 takes to finish, upon which the filter process of the current thread 401 depends. The quality difference calculation section 406 calculates the difference in quality between the case in which the current thread 401 waits for the reference thread 402 and the case in which the current thread 401 does not wait for the reference thread 402. As for the image quality, the quality of the image is subjectively evaluated or objectively evaluated with the use of PSNR values and the like.

When the current thread 401 does not synchronize, i.e. does not wait for the reference thread 402, the current thread 401 carries on with the filter process using the pixel values obtained before the filter process of the reference thread 402.

The quality difference calculation section 406 calculates not only the spatial positions of macro blocks or the synchronization control state of the preceding frames but also the quality difference using the intensity of the filter process. The filter process is dependent on the intensity of a filter or quantization steps. Accordingly, the calculation of the quality difference may involve quantization steps. However, the following describes an example of controlling only with the use of the intensity of a filter.

Figure 11:
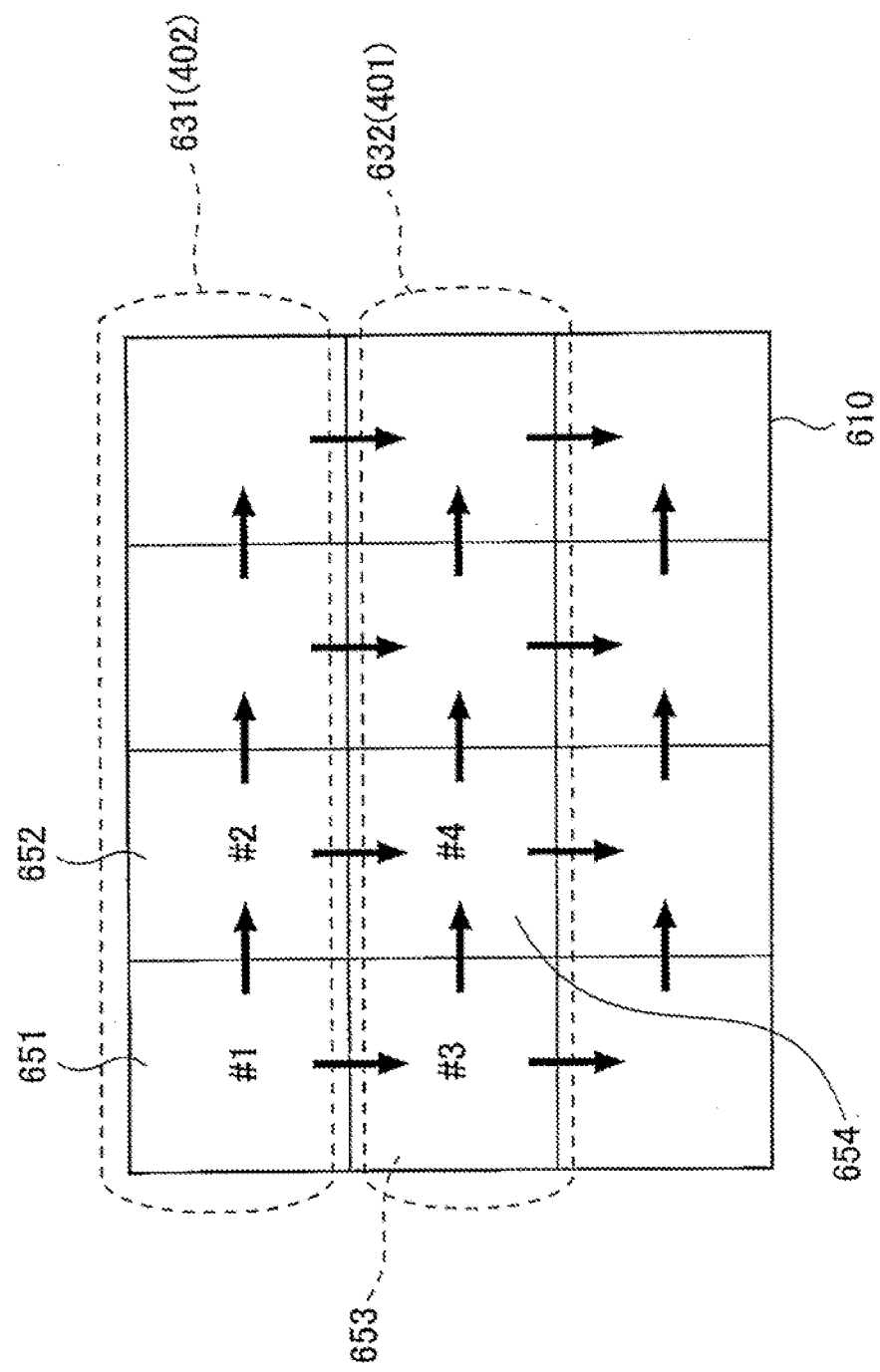
FIG. 11 An explanatory diagram concerning a specific example of the fourth embodiment of the present invention.

FIG. 11 shows the interdependence between blocks in the filter process by arrow. The filter process basically uses the pixel data of a block above or to the left of the block that has already undergone the filter process. For example, a filter process 652 of a second block (#2) is dependent on the results of a filter process 651 of a first block (#1). A filter process 653 of a third block (#3) is dependent on the filter process 651 of the first block (#1).

Originally, the filter processes 652 and 653 of the second and third blocks (#2) and (#3) should wait until the filter process 651 of the first block (#1) ends. Accordingly, when the filter process 653 of the third block (#3) is performed, the current thread makes a determination as to whether to wait until the filter process 651 of the first block (#1) in the reference thread ends.

The degree to which the image quality declines when the current thread does not wait for the reference thread is associated with the intensity of a filter (Boundary Strength Value: Bs value), for example, as disclosed in NPL 3. When the intensity of the macro block boundary is 4 (Bs=4), the impact extends from the boundary to the 14th pixel at most. Meanwhile, when the intensity of the filter is weak, other macro blocks are less impacted. Accordingly, when the quality of processing is calculated based on the intensity of the filter process, it is possible to appropriately estimate the quality difference.

The Bs value that is used in evaluating the quality difference is the Bs value of the vertical filter that is applied to the top-left boundary of a macro block. The above boundary exists between macro blocks: the Bs value therefore can be any one of the four values "4," "2," "1," and "0." When the filter process is performed using the pixels obtained before the filter process without waiting until the filter process of the upper block ends, there is the most significant decrease in quality when "Bs=4." In a simple evaluation example of the quality difference, suppose that the evaluation value is set to "5" when the Bs value is "4", and the evaluation values are set to "4," "3," and "2," when the Bs values are "2," "1," and "0," respectively.

The evaluation value of the waiting time can be determined as illustrated in FIG. 9. The synchronization determination section 405 compares the evaluation value of the waiting time with the evaluation value of the quality difference and makes a determination as to whether the current thread 401 needs to wait. For example, the synchronization determination section 405 determines to synchronize when the evaluation value of the waiting time is less than or equal to the evaluation value of the quality difference.

Incidentally, in the present example, the evaluation value of the quality difference is determined based on the intensity of the filter process but may be determined based on other factors. For example, the spatial positions of blocks for which the filter process is performed or the synchronization control state of the preceding frames may be taken into account.

In general, the decline in the quality of the image can hardly affect the macro block on the right end of the frame and the macro block at the bottom end. For such macro blocks, therefore, "1" is subtracted from the evaluation value of the quality difference. Thanks to such adjustments, a threshold value of the waiting time declines, leading to the determination of no waiting. Moreover, when it is determined that there should be no waiting process for a block at the same position as the preceding frame, the image quality could dramatically decline at the position. Accordingly, in such a case, "1" may be added to the evaluation value when the quality is evaluated in the current frame. Thanks to such adjustments, the threshold value of the waiting time rises, leading to the determination of waiting.

Example 2

Another specific example of the fourth embodiment will be described. As for the contents of a thread, in the above-described specific example 1, the deblocking filter process is used; in the present example, an intra-prediction process is used. When an intra-prediction process is not performed for pixels in the reference thread 402 that the current thread 401 is about to refer to in the same frame, the synchronization determination section 405 of the present example makes a determination as to whether to wait until the intra-prediction process ends. When the synchronization determination section 405 does not wait, the intra-prediction process is proceeded by using the pixel (which the intra-prediction process has not yet processed) at the current moment of the reference thread 402 or the pixel value of the preceding frame that has already undergone the intra-prediction process and is at the same position as a reference pixel.

The intra-prediction process for the H.264 brightness is performed for each 4×4 block or 16×16 block. For the 4×4-block intra-prediction process, nine types of prediction mode are prepared. For the 16×16-block intra-prediction process, four types of prediction mode are prepared.

The quality difference is estimated based on a prediction mode prepared as well as whether the macro block of the current thread 401 refers to the macro block of the reference thread 402. The quality difference indicates how different the impact of the reduction in the image quality inside the frame is between the case in which synchronization takes place and the case in which synchronization does not take place. In the case of the process that is carried out on a 4×4-block basis, for each of the sixteen 4×4-blocks of the macro block, a different prediction mode is applied, thereby preventing the impact of the reduction in the image quality from spreading across the frame, with the impact being confined to several blocks.

In a simple evaluation example of the quality difference, the following situation is possible: the evaluation value is set to "4" when the impact of the reduction in the image quality of the macro block being processed in the current thread 401 affects other macro blocks, the evaluation value is set to "3" when the impact is within the macro block, and the evaluation value is set to "2" when the impact is within the 8×8 block inside the macro block.

In the present example, a determination is made as, to whether the current thread 401 waits until the intra-prediction process in the reference thread 402 ends on the basis of the evaluation value of the quality difference calculated in the above manner and the evaluation value of the waiting time. Therefore, it is possible to control synchronization in a way that reduces the processing time while limiting the decline in the quality of the image output.

Example 3

Another specific example of the fourth embodiment will be described. In the present example, a motion prediction process for macro blocks is associated with the current thread 401, and a deblocking filter process for macro blocks is associated with the reference thread 402. In the present example, when the filter process of the reference thread 402 is not applied to the pixel that the motion prediction process of the current thread 401 refers to, a determination is made as to whether to wait until the filter process ends. If the process of waiting is not performed, the motion prediction process of the current thread 401 proceeds with the use of the pixel value obtained before the filter process.

Moreover, in the present example, the quality difference is calculated by using an predicted vector of the motion prediction process. A division area allocated to the reference thread 402 is a division area of the frame that appears immediately before the frame to which a division area allocated to the current thread 401 belongs.

In general, according to human perception characteristics, the accuracy of perceiving a fast-moving object is low. Therefore, the impact of the reduction in the image quality of the fast-moving object is less than that of a stationary object. Therefore, the quality of the image is evaluated with the use of the length of a motion vector based on the assumption that there is a correlation between the length of the motion vector and the traveling speed of the object.

In a simple evaluation example of the quality difference, the evaluation value comes to "4" when the length of the motion vector is zero. The evaluation value comes to "3" when the length of the motion vector is greater than zero and less than the average inside the frame. The evaluation value comes to "2" when the length of the motion vector is greater than the average inside the frame. A determination is made as to whether to wait until the filter process ends on the basis of the evaluation value of the above quality difference and the evaluation value of the waiting time. Accordingly, it is possible to control synchronization in a way that reduces the processing time while limiting the decline in the quality of the image output.

Example 4

Another specific example of the fourth embodiment will be described. In the present example, a motion vector search process of a given frame is associated with the current thread 401; a process of producing a reference image of a search area in another frame that is referred to in the process of searching for a motion vector is associated with the reference thread 402.

In an encoding process of an moving image, in general, an encoded image is once decoded before the image is used as a reference image for a subsequent frame. In the motion vector search process, the reference image is used to obtain a motion vector that is used for generating an intra-prediction image. In the present example, when the reference image of the vector search area has not been produced, a determination is made as to whether to wait until the producing process ends. If the process of waiting is not performed, the searching of the vector is conducted with the use of an area that can be referred to at the current moment.

Moreover, in the present example, the quality difference is calculated by using the motion vector of a surrounding block and a search evaluation value that uses the area that can be referred to at the current moment. A block allocated to the current thread 401 and the reference thread 402 is a division area in the same frame in the above-described specific example. In the present example, a division area allocated to the reference thread 402 is a division area inside a frame that is referred to in the process of searching for the motion vector. That is, the division area is not the frame of the current thread 401. Furthermore, the image quality is estimated based on the amount of codes that are generated when the macro block is encoded with the use of the motion vector obtained by searching.

In general, there is a strong correlation between the motion vector of a given block and the motion vector of a surrounding block. Accordingly, the motion vector of the surrounding block is used first to predict the motion vector of the block. A process of examining whether the predicted motion vector indicates an allocation area of the reference thread 402 follows. Then, a search evaluation process, such as a sum of absolute difference, takes place in the area that can be referred to at the current moment. A process of examining whether the best value obtained in the above process exceeds an upper limit is then performed. At this time, the following processes may be performed: the motion vector is predicted from the trend of the search evaluation value and it is predicted whether the motion vector indicates the allocation area of the reference thread 402.

In a simple evaluation example of the quality difference, the evaluation value is set to "4" when the predicted motion vector indicates the allocation area of the reference thread 402 and the evaluation value of the sum of absolute difference in the area that can be referred to at the current moment is less than an upper limit. The evaluation value is set to "3" only when the evaluation value of the sum of absolute difference is less than the upper limit. The evaluation value is set to "2" when the evaluation value of the sum of absolute difference exceeds the upper limit but the predicted motion vector indicates the allocation area of the reference thread 402. On the basis of the evaluation value of the above quality difference and the evaluation value of the waiting time, a determination is made as to whether to wait until the process of producing the reference image of the vector search area ends. Accordingly, it is possible to control synchronization in a way that reduces the processing time while limiting the amount of codes generated.

The present invention is not limited to the above embodiments. The applications of the present invention may be modified when needed within the scope of the appended claims. For example, the present invention can be applied as a computer program corresponding to the operation of the information processing device 400 and a storage medium in which the program is stored.

The invention claimed is:

1. A synchronization control method comprising:
    executing, by an information processing device, a current thread and a reference thread whose data is referred to by the current thread in parallel;
    determining, by the information processing device, whether the reference thread reaches a second synchronization point when the current thread reaches a first synchronization point;
    calculating, by the information processing device, the time needed for the reference thread to reach the second synchronization point as a waiting time of the current thread when the result of determination is negative;
    estimating, by the information processing device, a quality difference between data that the current thread generates by referring to processing data at the second synchronization point of the reference thread and data that the current thread generates without referring to the processing data; and
    determining, by the information processing device, whether to make the current thread wait until the reference thread reaches the second synchronization point depending on the waiting time and the magnitude of the quality difference, wherein:
    when the quality difference exceeds an upper limit, a time-out value obtained by adding a predetermined value to the waiting time is set, and when the quality difference is less than the upper limit, a time-out value obtained by subtracting a predetermined value from the waiting time is set; and
    it is determined that the current thread is forced to wait until the set time-out value comes through.

2. A synchronization control method comprising:
    executing, by an information processing device, a current thread and a reference thread whose data is referred to by the current thread in parallel;
    determining, by the information processing device, whether the reference thread reaches a second synchronization point when the current thread reaches a first synchronization point;
    calculating, by the information processing device, the time needed for the reference thread to reach the second synchronization point as a waiting time of the current thread when the result of determination is negative;
    estimating, by the information processing device, a quality difference between data that the current thread generates by referring to processing data at the second synchronization point of the reference thread and data that the current thread generates without referring to the processing data; and
    determining, by the information processing device, whether to make the current thread wait until the reference thread reaches the second synchronization point depending on the waiting time and the magnitude of the quality difference, wherein the current thread and the reference thread are an image process for an image frame, and
    the current thread and the reference thread are one of a deblocking filter process for different image blocks in the same image frame and an intra-prediction process for different image blocks in the same image frame.

3. The synchronization control method according to claim 2, wherein,
    when the quality difference is less than an upper limit, it is determined that the current thread is not forced to wait.

4. The synchronization control method according to claim 3, further comprising one of:
    determining that the current thread is not forced to wait when the waiting time exceeds the upper limit;
    determining that the current thread is forced to wait when the waiting time is less than the upper limit.

5. The synchronization control method according to claim 2, further comprising:
    recalculating the waiting time when the current thread is waiting;
    determining whether there is delay in the progress of the reference thread using the result of recalculation; and
    stopping the waiting of the current thread when it is determined that there is delay in the progress of the reference thread.

6. The synchronization control method according to claim 2, wherein
    the data generated by not referring to the processing data is one of data generated by referring to data at the current moment of the reference thread and data generated by referring to data processed by the reference thread.

7. An information processing device comprising:
    a computer;
    a synchronization control section of the computer and that executes a current thread and a reference thread whose data is referred to by the current thread in parallel;
    a waiting time calculation section of the computer and that calculates the time needed for the reference thread to reach a second synchronization point as a waiting time of the current thread when the reference thread does not reach the second synchronization point at a time when the current thread reaches a first synchronization point;
    a quality difference calculation section of the computer and that estimates a quality difference between data that the current thread generates by referring to processing data at the second synchronization point of the reference thread and data that the current thread generates without referring to the processing data; and a synchronization determination section of the computer and that determines whether to make the current thread wait until the reference thread reaches the second synchronization point depending on the waiting time and the magnitude of the quality difference, wherein the synchronization determination section sets a time-out value obtained by adding a predetermined value to the waiting time when the quality difference exceeds an upper limit and sets a time-out value obtained by subtracting a predetermined value from the waiting time when the quality difference is less than the upper limit, and determines that the current thread is forced to wait until the set time-out value comes through.

8. An information processing device comprising:

a computer;

a synchronization control section of the computer and that executes a current thread and a reference thread whose data is referred to by the current thread in parallel;

a waiting time calculation section of the computer and that calculates the time needed for the reference thread to reach a second synchronization point as a waiting time of the current thread when the reference thread does not reach the second synchronization point at a time when the current thread reaches a first synchronization point;

a quality difference calculation section of the computer and that estimates a quality difference between data that the current thread generates by referring to processing data at the second synchronization point of the reference thread and data that the current thread generates without referring to the processing data; and a synchronization determination section of the computer and that determines whether to make the current thread wait until the reference thread reaches the second synchronization point depending on the waiting time and the magnitude of the quality difference, wherein the current thread and the reference thread are an image process for an image frame, and the current thread and the reference thread are a deblocking filter process for different image blocks in the same image frame and an intra-prediction process for different image blocks in the same image frame.

9. The information processing device according to claim 8, wherein, when the quality difference is less than an upper limit, the synchronization determination section determines that the current thread is not forced to wait.

10. The information processing device according to claim 9, wherein the synchronization determination section further determines one of:

that the current thread is not forced to wait when the waiting time exceeds the upper limit;

that the current thread is forced to wait when the waiting time is less than the upper limit.

11. The information processing device according to claim 8, wherein:

the waiting time calculation section further recalculates the waiting time when the current thread is waiting;

the synchronization determination section determines whether there is delay in the progress of the reference thread using the result of recalculation and stops the waiting of the current thread when it is determined that there is delay in the progress of the reference thread.

12. A non-transitory computer-readable medium stored therein a program that causes a computer to execute synchronization control method, the synchronization control method comprising:

executing a current thread and a reference thread whose data is referred to by the current thread in parallel;

determining whether the reference thread reaches a second synchronization point when the current thread reaches a first synchronization point;

calculating the time needed for the reference thread to reach the second synchronization point as a waiting time of the current thread when the result of determination is negative;

estimating a quality difference between data that the current thread generates by referring to processing data at the second synchronization point of the reference thread and data that the current thread generates without referring to the processing data; and determining whether to make the current thread wait until the reference thread reaches the second synchronization point depending on the waiting time and the magnitude of the quality difference, wherein the current thread and the reference thread are an image process for an image frame, and the current thread and the reference thread are one of a deblocking filter process for different image blocks in the same image frame and an intra-prediction process for different image blocks in the same image frame.

* * * * *